United States Patent [19]

Seitz

[11] Patent Number: 4,940,738

[45] Date of Patent: * Jul. 10, 1990

[54] HIGH SOLIDS CB PRINTING INK CONTAINING A PROTECTIVE COLLOID BLEND

[75] Inventor: Michael E. A. Seitz, Dayton, Ohio

[73] Assignee: The Standard Register Company, Dayton, Ohio

[*] Notice: The portion of the term of this patent subsequent to Dec. 26, 2006 has been disclaimed.

[21] Appl. No.: 392,478

[22] Filed: Aug. 11, 1989

Related U.S. Application Data

[63] Continuation of Ser. No. 141,632, Jan. 7, 1988, Pat. No. 4,889,877.

[51] Int. Cl.$^5$ ................................................ C09D 5/00
[52] U.S. Cl. ........................................... 523/161; 523/210; 106/20; 106/32; 264/4.7
[58] Field of Search ................ 523/161, 210; 264/4.7; 106/20, 32

[56] References Cited

U.S. PATENT DOCUMENTS

| | | |
|---|---|---|
| 2,800,457 | 7/1957 | Green . |
| 3,016,308 | 1/1962 | Macaulay . |
| 3,079,351 | 2/1963 | Staneslow . |
| 3,427,180 | 2/1969 | Phillips . |
| 3,432,327 | 3/1969 | Kan . |
| 3,551,181 | 12/1970 | Kimura et al. . |
| 3,684,549 | 8/1972 | Shank . |
| 3,914,511 | 10/1975 | Vassiliades . |
| 4,097,619 | 6/1978 | Davis . |
| 4,112,138 | 9/1978 | Davis . |
| 4,138,362 | 2/1979 | Vassiliades . |
| 4,161,570 | 7/1979 | Lee . |
| 4,193,889 | 3/1980 | Bootz . |
| 4,356,108 | 10/1982 | Schwab . |
| 4,404,251 | 9/1983 | Jobs . |
| 4,428,978 | 1/1984 | Jobs . |
| 4,435,340 | 3/1984 | Horiike . |
| 4,534,783 | 8/1985 | Beestman ............... 264/4.7 |
| 4,569,844 | 2/1986 | Jones ..................... 264/4.7 |
| 4,675,249 | 6/1987 | Bowman ................ 264/4.7 |
| 4,711,749 | 12/1987 | Kosaka et al. ......... 264/4.7 |
| 4,753,759 | 6/1988 | Fukuo et al. ........... 264/4.7 |

Primary Examiner—Joseph L. Schofer
Assistant Examiner—Peter D. Mulcahy
Attorney, Agent, or Firm—Killworth, Gottman, Hagan & Schaeff

[57] ABSTRACT

A high solids content, aqueous, microcapsule-containing printing ink is prepared by forming microcapsules in situ in a printing ink vehicle. The microcapsules are preferably prepared by interfacial polymerization or interfacial crosslinking between a reactant, such as a polyisocyanate dissolved in an oily solution and a co-reactant such as a polysalt of casein and diethylene triamine present in an aqueous solution into which the oily solution is dispensed. The aqueous solution contains water and a non-volatile diluent such as a non-reducing sugar, for example methyl glucoside. The printing ink preferably has a 60–70% by weight solids content and may be used as a low-coat-weight CB coating for preparing carbonless copy paper.

12 Claims, No Drawings

HIGH SOLIDS CB PRINTING INK CONTAINING A PROTECTIVE COLLOID BLEND

CROSS REFERENCE TO RELATED APPLICATIONS

This is a continuation of application Ser. No. 141,632, filed Jan. 7, 1988, now U.S. Pat. No. 4,889,877.

Reference is made to my copending application, Ser. No. 141,633 filed on Jan. 7, 1988, now U.S. Pat. No. 4,889,877 entitled "Production of Microcapsules", the disclosure of which is hereby incorporated by reference.

FIELD OF THE INVENTION

The Present invention relates to a process for the production of a high solids content, aqueous, microcapsule-containing. Printing ink and to the printing inks so produced. More particularly, the present invention relates to the production of high solids content, aqueous, CB printing inks which may be press-applied in the production of carbonless copy paper.

BACKGROUND OF THE INVENTION

In the manufacture of pressure-sensitive recording papers better known as carbonless copy papers, a layer of pressure-rupturable microcapsules containing a solution of colorless dyestuff recursor is normally coated on the back side of the front sheet of paper of a carbonless copy paper set. This coated backside is known as the CB coating. In order to develop an image or copy, the CB coating must be mated with a paper containing a coating of a suitable color developer, also known as dyestuff acceptor, on its front. This coated front color developer coating is called the CF coating. The color developer is a material, usually acidic capable of forming the color of the dyestuff by reaction with the dyestuff precursor.

Marking of the pressure-sensitive recording papers is effected by rupturing the capsules in the CB coating by means of pressure to cause the dyestuff precursor solution to be exuded onto the front of the mated sheet below it. The colorless or slightly colored dyestuff, or dyestuff precursor, then reacts with the color developer in the areas at which pressure was applied thereby effecting the colored marking. Such mechanism for the technique of producing pressure-sensitive recording papers is well known.

Among the well known color developers used on CF record sheets are phenolic-type resins such as acetylated phenolic resins salicylic acid modified phenolics and, particularly, novolac type phenolic resins.

Among the well known basic reactive colorless chromogenic dye precursors useful for developing colored marks when and where applied to a receiving sheet coated with such color developers are Crystal Violet Lactone (CVL). the P-toluenesulfonate salt of Michler's Hydrol or 4,4'-bis(diethylamino)benzhydrol, Benzoyl Leuco Methylene Blue (BLMB), Indolyl Red Malachite Green Lactone, 8'-methoxybenzoindoline spiropyran. Rhodamine Lactone, and mixtures thereof.

Microencapsulation has been used in the production of carbonless copy papers for some time. One of the major techniques involves phase separation from an aqueous solution. The complex coacervation process (U.S. Pat. No. 2,800,457 and others) falls into this category. In such a process, a phase separation into a liquid condensed colloid phase and a dilute colloid phase results from two oppositely charged condensed colloids neutralizing each other. Under appropriate conditions, the condensed colloid phase can be induced to first surround and envelope the oil droplets and then be hardened to form the microcapsules.

Another method of producing CB microcapsules involves polymerization or interfacial crosslinking. Typically a film forming substance, such as an epoxy compound, a polyvalent isocyanate, or a polyacyl halide reactant is dissolved in a hydrophobic oily solution phase and a coreactant such as a polyfunctional amine or a polyvalent hydroxy compound is dissolved in a hydrophilic aqueous solution phase. An emulsion is formed from the two phases the reactant and coreactant combine in the emulsion and a wall is formed by interfacial polymerization or interfacial crosslinking around droplets of the oily solution phase (internal phase) to form the microcapsules. See for example, Kan Patent No. 3,432,327 wherein a large number of reactants and coreactants are designated. Generally the fragile capsules produced by the simple interfacial polymerization/crosslinking are inadequate for the processing procedures needed for preparing carbonless papers namely, filtration and dispersion into ink vehicles.

A method to improve the strength of capsule walls is shown in U.S. Pat. No. 4.404.251, which discloses printing ink containing microcapsules containing dye precursors. The microcapsules are made by polyaddition of a polyisocyanate and a polyamine and the aqueous phase may contain protective colloids and emulsifiers.

Reference is also made to U.S. Pat. No. 4,193,889 which discloses microcapsules and a process for the production of microcapsules, the walls of which consist of polycondensates of a film-forming aliphatic polyisocyanate containing at least one biuret group, or polyaddition products thereof with a chain extending agent. The chain extending agent is preferably either water, a polyol or a polyamine. It is stated in that patent that the so-produced microcapsules have improved toughness, show adequate crosslinking density, and, therefore are only slightly permeable to easily volatile encapsulated substances.

Another method for dealing with the problems of fragile microcapsules is disclosed in U.S. Pat. No. 4,435,340, wherein an isocyanate is used in the hydrophobic phase and a polyamine, such as a low molecular weight polyamine is used in the hydrophilic phase. Microcapsules are formed by interfacial polymerization. U.S. Pat. No. 4.356 108 also discloses an encapsulation process by interfacial reaction of an isocyanate and a low molecular weight polyamine.

Finally, an improvement on the interfacial polymerization method of encapsulation is found in my copending application Ser. No. 141,633 filed on an even date herewith. That improvement involves reacting a crosslinking agent, such as a polyisocyanate, dissolved in the oily solution phase with a polysalt made up of a high molecular weight polyanion, such as casein, and a low molecular weight polycationic polyamine, dissolved in the aqueous solution phase. That process results in microcapsules which are thicker and stronger than microcapsules produced by ordinary interfacial polymerization.

Whichever encapsulation method is used, a problem remains in terms of the ink vehicle and CB coating method. According to the oldest prior art concerning the technology of CB coating, such coating was carried out with an aqueous coating composition over the entire surface of the substrate, as shown in German Offenlegungsschrifts Nos. 1,934,437 and 1 955.542. The process described in these patents has the disadvantage that, following application of the coating composition the water is evaporated and this requires a considerable input of energy. Additionally the need for drying requires the use of a complex and expensive apparatus for an aqueous coating composition. Another problem concerns removal of the polluted water which emanates from production and from the purification of the aqueous coating composition.

If volatile organic solvents are used in the production of the coatings the excess solvent also has to be evaporated in order to dry the coating. This results in the formation of solvent vapors which are particularly dangerous.

There are also numerous known processes for applying coating compositions to a paper substrate. According to the prior art, aqueous or solvent-containing coatings may be applied to a paper substrate by rotogravure or flexoprinting as shown in U.S. Pat. Nos. 3,016,308 or 3,914,511. These processes also have the disadvantage that the coatings must be subsequently dried. For these reasons, it was proposed, as shown in U.S. Pat. Nos. 3,079,351 and 3,684,549, to take up the microcapsules in waxes and to coat the paper substrate with hot melt systems of this type. See also U.S. Pat. Nos. 4,112,138 and 4,097,619 which disclose processes for the application of microcapsules to paper by means of a non-aqueous solvent-free hot melt system, or by means of a radiation-curable system. In U.S. Pat. No. 4,161,570 microcapsules are added to a radiation-curable substance without first spray-drying. Although these proposed measures avoid removal of the solvents, the wax-like coating changes the character of the paper because relative large quantities of wax must be applied. Additionally, the melt systems are applied by means of hot carbon printing machines which, although enabling printing, coating with waxes, and finishing to be combined in an online system, always require a separate installation for each process step.

Accordingly it remains more desirable to use an aqueous-based CB ink if the solids content of that ink is high enough to avoid the problems found with typical aqueous-based CB inks. The major problem with aqueous CB inks is the large drying capacity required. For example, a 45% solids content CB Printing ink has a 55% water content which dictates the use of a large amount of energy to dry the coating. In a typical CB coating at 1.25 lbs/ream dry weight (which contains 1.0 lbs/ream capsules), the coating must be applied at 2.78 lbs/ream wet (i.e. 1.25 lbs/ream divided by 0.45). That means that around 1.5 lbs/ream of water must be removed. In addition when this much water is added to a sheet, numerous controls must be added to the coater to prevent sheet distortions like curl or cockle. Special grades of paper are also required to avoid excessive penetration and web breaks on the coater. The result is a coater and accompanying facilities that are very expensive to build and operate. The centralization of production, due to high capitalization costs, also produces cost inefficiencies in the form of high scrap levels and transportation costs. All of these factors add to the cost of the CB coated sheet.

In order to overcome these problems there have been various proposals for production of high solids content, aqueous CB Printing ink. For example, in Jabs U.S. Pat. No. 4,428,978 there is disclosed a process for the production of aqueous suspensions containing from 35 to 60% by weight of microcapsules prepared by interfacial polyaddition from polyisocyanates and H-active compounds, wherein (a) n isocyanaurate-modified aliphatic polyisocyanate is used as the polyisocyanate, and (b) the suspension is adjusted to a pH value of $\leqq 7$ after the polyaddition reaction. It is disclosed that the suspension may be converted into agglomerated-free capsule powders, for example by spray drying, or the suspensions may be used directly for the production of aqueous flexograph pastes and concommittently the production of completely or partly coated carbonless copy papers by flexograph process printing. The preferred aqueous solution phase as shown in the examples in Jabs is a polyamine dissolved in water, to which an aqueous acid is added after the polyaddition reaction takes place.

Another patent which discusses high solids content, aqueous-based. CB Printing inks is Vassilliades U.S. Pat. No. 4,138,362. Vassilliades discloses producing microcapsules by admixing a water-immiscible, oily material containing an oil-soluble, non-polymeric polyfunctional isocyanate cross-linking agent, and an aqueous solution of a polymeric emulsifyinq agent in the form of a water-soluble polymer containing recurring-$NH_2$ or $= NH$ groups or a water-soluble natural gum containing recurring hydroxy groups. A water-in-oil emulsion is formed and a solid capsule wall is formed by the cross-linking of the emulsifying agent by the isocyanate. When the emulsion contains a natural polymeric emulsifying agent, a viscosity lowering agent in the form of a urea-formaldehyde or alkali metal periodate may be added in order to obtain a higher solids coat weight while at an efficient coating viscosity. The preferred aqueous solution phase as shown in the examples in Vassilliades is an aqueous chitosan or gelatin-mixed solution containing a water-soluble urea-formaldehyde prepolymer. In the case of casein, the capsules produced by the Vassilliades method are extremely poor. The capsules are very fragile, due to a very thin wall, and exhibit poor aging as a result of a steady release of the solutions they contain.

Despite these teachings, processes for printing microcapsules in coating compositions on offset printing machines or even book printing machines were heretofore regarded as unworkable because both in the production of the printing ink and in the distributor rollers of the printing machine and during the printing process, shearing and compressive forces would destroy most of the microcapsules. A process for producing printing inks which may be press applied is described in U.S. Pat. No. 4,404,251, referred to previously, in which formed microcapsules are formulated into the printing ink composition either by stirring the aqueous dispersion of microcapsules directly in the binder and subsequently removing the water in vacuo (the so-called flushing process), or by spray-drying the microcapsules and then adding to the binder. These processes require special equipment and are not entirely satisfactory. In the former process, the hydrophilic nature of the microcapsules may make direct incorporation into the binder very difficult. The spray-drying technique is very costly. Furthermore during spray-drying some capsules inevitably aggregate which results in a large particle size distribution. The aggregates can easily reach 100 microns or more, and once formed are virtually impossible to break up non-destructively to the capsule. Such large particles are quite unsuitable for inks.

Accordingly the need remains for an improved process for the production of high solids content, aqueous, CB printing inks and for high solids content, aqueous, CB printing inks which contain microcapsules which are sufficiently strong to be press applied.

SUMMARY OF THE INVENTION

That need is met by the present invention which provides a process for making a high solids content, aqueous, microcapsule-containing printing ink by preparing a dispersion of microcapsules (microcapsule slurry) in the ink vehicle itself. The result is a complete CB printing ink with a solids content preferably in the range of approximately 60-70% by weight.

The microencapsulation method is preferably an interfacial polymerization or interfacial crosslinking one wherein a reactant, preferably a crosslinking agent such as a polyisocyanate, is dissolved in an oily solution which will serve as the internal phase of the microcapsules. Thus, for a CB ink, the oily solution will contain an oil solvent and a dye precursor capable of reacting with a color developer in order to form a color. The crosslinking agent is dissolved in that oily solution.

The oily solution having the reactant dissolved therein is, then, dispersed into an aqueous solution to form an emulsion. A coreactant may be added either before or after emulsification. In any event, as is known, the reactant and coreactant react in the emulsion by an interfacial polymerization or interfacial crosslinking mechanism to form a hard thick capsule wall around droplets of the oily solution and produce microcapsules. Preferably, the coreactant is a polysalt of the type disclosed in copending application Ser. No. 141,633. As disclosed therein a polysalt includes a high molecular weight polyanion, such as casein, and a polycationic polyamine having a molecular weight of less than 1200 and having a functionality of at least three, such as diethylene triamine.

A key to production of the high solids content printing ink of the present invention is the use of a non-volatile diluent in the aqueous solution as a co-solvent along with water. The non-volatile diluent should be soluble in water (i.e. greater than about 33% solubility in water), immiscible in the oily solution, non-reactive with the reactant and coreactant capsule wall materials, and have a low viscosity (i.e. less than approximately 50 cps). Preferably, the non-volatile diluent should also be relatively non-hygroscopic, be a non-plasticizer for the capsule wall, have a vapor pressure of less than about 0.1 mm Hg, and be essentially tack free when dried. The preferred non-volatile diluents are non-reducing sugars such as methyl glucoside, but other materials such as dimethyl urea, dimethyl hydantoin formaldehyde resin, and sorbitol, erythritol, and polyoxyethylene polyols such as Carbowax 4000 can also be used.

Another important but optional, feature of the present invention is the inclusion of a high concentration of a blend of protective colloids and/or binders (hereinafter referred to alternatively and collectively as "protective colloid blend") in the printing ink in order to obtain good transfer properties required to apply the printing ink at low coat weights. Normally a high concentration of protective colloid or binder reduces the intensity of color formed with the CB dye precursor. In the present invention that reduction is avoided through the use of blends of hard brittle, poor-film-forming polymers or resins with soft, pliable, film-forming ones. The protective colloid blend is preferably a mixture of two or more of the following materials: styrene-maleic anhydride copolymers, methyl vinyl ether-maleic anhydride copolymers, styrene-maleic ester copolymers, methyl vinyl ether-maleic ester copolymers, carboxymethylcellulose, casein, polyvinyl pyrrolidone, acrylic resins, and styrenated acrylic resins. As a further optional feature, a binder emulsion such as a styrene/acrylic or a styrene/butadiene latex or alkali (usually ammonia) soluble resin such as an acid modified rosin resin or a low molecular weight acrylic resin or styrene maleic anhydride resin may be added to the ink at the end of process to improve the moisture resistance and drying rate of the printing ink.

In the preferred process the oily solution contains an oily solvent present in an amount of 23-43% (all percentages being based on the total weight of the printing ink) and 4.5-6.5% of the dye precursor. The reactant dissolved in the oily solution preferably is present in an amount ranging from 1 to 3.5%. In the aqueous solution preferably there is found 24-40% water and 12-25% (most preferably 13-20%) non-volatile diluent. The coreactant which may be dissolved in the aqueous solution and added before emulsification or added after emulsification preferably is present in an amount ranging from 0.3 to 1.5%. If used, the optional protective colloid blend may be present in an amount ranging from 4-8% and if used the optional binder emulsion or alkali soluble resin may be present in an amount ranging from 0.001 to 20.0%.

The resulting printing ink thus will have as the preferred ingredients: 38% water, 16% non-volatile diluent 36% oil-containing microcapsules, 6% protective colloid blend, 1.5% binder emulsion or alkali soluble resin, and 2.5% miscellaneous ingredients such as defoamers, slip agents, and preservatives. It has been found that a CB printing ink so formulated has both a high solids content and superior transfer properties that enable it to be coated at a low coat weight (i.e. about 0.5 lbs./ream of 17"×22"paper).

The combination of these two features—high solids content and low coat weight—enables one to coat the present CB printing ink with only minimal amounts of water added to the sheet. For example, at a 0.5 lbs./ream dry coat weight of CB printing ink having a 65% solids content, a 0.77 lbs./ream wet coating is applied (0.5÷0.65=0.77). Therefore only 0.27 lbs./ream (0.77−0.5=0.27) of water is applied to the sheet along with the microcapsules. This represents over an 80% reduction in water content as compared to ordinary aqueous flexograph inks. The reduction is achieved through the formulation of the present invention, not through expensive drying or flushing processes. The small amount of water that is added to the sheet is insufficient to cause the sheet distortions that plague normal aqueous coatings. Only modest efforts are required to dry the CB coating of the present invention to a tack-free condition. A heated roll, air bar, or mini-box dryer is adequate to assist drying. As a result the CB printing ink of the present invention can be run on a simple flexo or offset gravure unit which can fit easily into an existing press line.

While a printing ink containing CB microcapsules as described above is the preferred form of present invention, the oil-containing microcapsules of the present invention may include substances other than dye precursors. For example, fragrances, insecticides, liquid crystals and other frequently encapsulated substances may also be used.

Accordingly, it is an object of the present invention to provide an improved process for the production of high solids aqueous, microcapsulecontaining printing ink and a printing ink so produced. These and other objects features and attendant advantages of the present invention will become apparent to those skilled in the art from a reading of the following detailed description of the preferred embodiments and the appended claims.

DETAILED DESCRIPTION OF THE PREFERRED EMBODIMENTS

In the preferred embodiment, the printing ink of the present invention may be used to prepare CB coated carbonless copy papers using simple flexographic or offset gravure techniques. Since the preferred microcapsules are relatively strong they can withstand the pressures involved in such printing techniques without undue premature rupture.

The preferred microencapsulation method is that set forth in, copending application Ser. No.141,633 although, as mentioned previously other interfacial polymerization or interfacial crosslinking methods may also be used. As disclosed in my copending application, an oily solution of a dye precursor in an oily solvent and containing a crosslinking agent is emulsified into an aqueous solution of casein or other polyanion that has been dissolved using a weak base. A polyamine preferably with a functionality of 3 or more, and preferably having a molecular weight of less than 1200 is added either before or after emulsification.

The preferred polyamine also preferably has at least one active hydrogen available on at least two of the three amino groups. Examples of suitable polyamines are diethylenetriamine, triethylenetetramine, iminobispropylamine, bis(hexamethylene)triamine, polyoxypropylenetriamines, polyoxypropylenepolyamines, and amine epoxy adducts (hydroxyalkyl-substituted polamines).

The polyanion and polyamine form a complex or polysalt which serves as a coreactant for the crosslinking agent. The crosslinking agent, then, is the reactant which reacts with both segments of the polyamine-polyanion complex simultaneously, or with the polyamine segment causing the polyanion segment to precipitate concurrently, or by both mechanisms. Examples of appropriate crosslinking agent reactants are polyisocyanates, polyacid chlorides, polyanhydrides, polyepoxides, polychloroformates, or polyaldehydes. It has been found that the crosslinking agent works best in the system of the present invention when it contains a functionality of at least three.

Isocyanates suitable for this purpose are polyisocyanates and polyisocyanate prepolymers. The term "polyisocyanate" includes polyisocyanates and polyisothiocyanates. Examples of suitable oleophilic polyisocyanates include diisocyanates such as m-phenylenediisocyanate, p-phenylenediisocyanate, 2,6-tolylenediisocyanate 2,4-tolylenediisocyanate, naphthalene-1,4-diisocyanate, diphenylmethane-4,4-diioscyanate, 3,3'dimethoxy-4,4'-biphenyldiioscyanate, 3,3'-dimethyldiphenylmethane-4,4'-diisocynate, xylylene-1,4-diisocyanate, xylylene-1,3-diioscyanate, 4,4'-diphenylpropanediisocyanate, trimethylenediisocyanate, hexamethylenediisocyanate, propylene-1,2-diisocyanate, butylene-1,2-diisocyanate, ethylidynediisocyanate, cyclohexylene-1,2-diisocyanate, cyclohexylene-1,4-diisocyanate, xylylene-1,4-diisothiocyanate, ethylidynediisothiocyanate, hexamethylenediisocyanate, etc.; triisocyanates such as 4,4',4"-triphenylmethanetriisocyanate, toluene-2,4,6-triisocyanate, etc; and tetraisocyanates such as 4,4'-dimethyldiphenylmethane, 2,2',5,5'-tetraisocyanate, etc. Particularly preferred are the addition product of hexamethylene diisocyanate and hexane triol the addition product of 2,4-toluene diisocyanate with pyrocatechol, the addition product of toluene diisocyanate with hexane triol, the addition product of toluene diisocyanate with trimethylol propane, the addition product of tetramethylxylene diisocyanate with trimethylol propane, the addition product of hexamethylene diisocyanate with trimethylol propane, or suitable polyisocyanates analogous to the compounds mentioned, or methylene (polyphenyl isocyanate).

Other usable modified isocyanates are those based on hexamethylene-1,6-diisocyanate m-xylylene diisocyanate, 4,4'-diisocyanato-dicyclohexyl methane and isophorone diisocyanate which contain at least two functional isocyanate groups per molecule. Polyisocyanates based on derivatives of hexamethylene-1,6-diisocyanate having a biuret structure, as disclosed in U.S. Pat. No. 4,051,165, or having an isocyanurate structure are also comprehended.

The oily solution into which the reactant is dissolved preferably contains an oily solvent such as any of the dye precursor solvents normally used in CB systems. Suitable materials include alkylated naphthalenes, alkylated biphenyls, chlorinated diphenyls, diphenyl methanes and ethanes alkyl phthalates, and the like. Additional oily solvent materials which may be employed include the alipbatic and aromatic hydrocarbon oils such as kerosene, mineral spirits naphtha, xylene, toluene, and the like.

Likewise, with a CB printing ink typical dye precursors may be used. These include triphenyl methane and diphenyl methane compounds including the well known leuco dyes, xanthene compounds, thiazine compounds, spiropyran compounds, and the like.

The aqueous solution which serves as both the aqueous emulsion phase for the microencapsulation process and the aqueous ink vehicle for the CB printing ink preferably contains water and optionally a weak base such as sodium hydroxide sodium tetraborate (borax) and the like, as is typical. However, unlike typical aqueous solutions used in interfacial polymerization or interfacial crosslinking, the aqueous solution of the present invention also contains a non-volatile diluent.

The non-volatile diluent is used as a co-solvent with water to provide the liquid media for the encapsulation reaction. The properties it should possess include:

(i) Its solubility in water should be >33%.

(ii) The viscosity of its aqueous solution should be low, i.e. <50 cps. This effectively restricts the non-volatile diluent to low molecular species.

(iii) The relative chemical reactivity towards the capsule wall precursors (i.e. reactant and coreactant) should be negligible that is similar to water in that it does not participate in the wall forming reaction.

(iv) The non-volatile diluent cannot be miscible or soluble in the oily solution.

The above properties are important in terms of the substitution of non-volatile diluent for some of the water in the encapsulation process. In order for the final ink matrix of the CB printing ink to function adequately (in drying, imaging, and aging) additional desirable features include:

(v) The material should be non-hygroscopic (or only slightly). Otherwise, the non-volatile diluent will slow the water loss to such an extent as to cause tracking (incompletely drying).

(vi) The dried non-volatile diluent material should be essentially tack free.

(vii) The non-volatile diluent should not plasticize the protective colloid blend or the capsule wall. Unacceptable amounts of smudge (inadvertent discoloration) can occur from the CB material if this requirement is ignored.

(viii) The vapor pressure to the non-volatile diluent should be less than 0.1 mm Hg to avoid environmental restrictions and assure worker safety.

Preferred as the non-volatile diluent is a non-reducing sugar such as methyl glucoside. Other materials which may be used include selected polyols, amides, and ureas such as dimethyl urea, dimethyl hydantoin formaldehyde resin, sorbitol, erythritol, and polyoxyethylene polyols such as Carbowax 4000.

In terms of the preferred CB printing ink, it is also desirable to add to the microcapsule slurry a relatively high concentration of a protective colloid blend. The use of a relatively high level of a protective colloid blend insures the desired microcapsule particle size, which is that 95% of the capsules should be 5 microns or less for a 0.5 lbs./ream coating. The protective colloid blend also provides desirable barrier and mechanical properties for the CB coated sheet during handling and storage. Finally, as mentioned, the protective colloid blend is preferably a blend of hard, brittle, poor-film forming polymers or resins such as casein, styrene-maleic anhydride, styrene-maleic anhydride ester copolymers, styrenated acrylics and carboxymethyl cellulose with soft, pliable, film forming ones such as polyvinyl pyrrolidone, acrylic, methyl vinyl maleic anhydride copolymers, polyvinyl alcohol, and methyl vinyl ether-maleic ester copolymers. In this manner the mechanical hardness properties of the CB coated sheet can be adjusted to allow for fracture under the appropriate stress.

As a further modification a binder emulsion such as a styrene/acrylic or styrene/butadiene latex or an alkali (usually ammonia) ammonia soluble resin such as an acid modified rosin resin or a low molecular weight acrylic resin or styrene maleic anhydride resin may be added to the microcapsule slurry to improve the properties of the CB printing ink.

Generally, the total encapsulation mixture which will form the CB printing ink contains by weight approximately:

| Ingredient | Weight % |
| --- | --- |
| Oily solvent | 23-43 |
| Dye precursor(s) | 4.5-6.5 |
| Reactant/Coreactant | 1.0-5.0 |
| Protective Colloid Blend (optional) | 4-8 |
| Water | 24-40 |
| Non-volatile diluent | 12-25 |
| Base (optional) | 7-27 |
| Binder Emulsion or alkali soluble resin (optional) | 0.001 to 20 |

The resulting CB printing ink will have as its preferred ingredients in the approximate amounts by weight of:
38% water
16% non-volatile diluent
36% oil-containing microcapsules
6% protective colloid blend
1.5% binder emulsion or alkali soluble resin
2.5% miscellaneous ingredients The following examples will more clearly define the invention:

EXAMPLE I (a) Oily Solution

In a 2L beaker 33.25 g Pergascript I-GD Green, a dye precursor from Ciba-Geigy of Greensboro, N.C., 20.85 g Copikem XX Red, a dye precursor from Hilton-Davis of Cincinnati, Ohio. 8.5g Copikem I Blue, also from Hilton-Davis, and 81.25 g Pergascript I-BR Black, also from Ciba Geigy, were dissolved in 707.5 g diisopropyl naphthalene. The mixture was heated to 110° C. to effectively dissolve the dye precursors. After the dyes were dissolved, 93.75 g Norpar 13 Special, an aliphatic oily solvent from Exxon of Baytown, Tex., was added and the hot solution cooled to 25° C. At that point 45 g Desmodur N-3200, a biuret containing polyisocyanate from Mobay Chemical Corp. of Pittsburgh, Pa., was added and the mixture stirred until a clear solution was obtained.

(b) Aqueous Solution

In a 4L beaker containing 785 g of water, 87.5 g casein was added followed by 3.7 g of a 50% sodium hydroxide solution, and 3.2 g Borax. The mixture was heated to 60° C. and maintained for 30 minutes. The heat was turned off and 537.5 g Sta-Meg 104, a methyl glucoside non-volatile diluent from Horizon Chemical Corp. of Decatur, Ill., was added. After stirring for 15 minutes, 87.5 g polyvinyl pyrrolidone (PVP K-30, molecular weight ~40,000) was added. The solution was then cooled to 30° C.

(c) Encapsulation/Compounding Process

The aqueous solution (b) was placed in a Waring blender connected to a Variac. With the blender set on low and the Variac at 60%, the oily solution (a) was poured into the vortex within a period of 30 seconds. After the addition was complete, the Variac was set to 90%, and the blender was allowed to run for an additional 30 seconds. The emulsion was then transferred to the 4 L beaker, and stirred moderately to produce a slight vortex. Then 10.9 g diethylene triamine in 10.9 g water was added to the emulsion. The mixture is heated to 60° C. and held at that temperature for 2 hours. After cooling to room temperature, 62.5 g Neptune 1-Nl, a micronized polyethylene wax slip agent from Shamrock Chemical Corp. of Newark, N.J., was added. The ink at 69% solids was diluted with water (around 225 g H$_2$O) to 62.5% solids. The viscosity was ~600 cps at 24° C. pH=8.4. Defoamer, such as 50 g of SWS-213 silicone emulsion from SWS Company, may be added if needed. The capsule size is 3 microns. The CB Printing ink will contain 60% capsules by weight. When coated at 0.5#/R (17×22), the CB coating is capable of producing an intense black image upon rupture of the microcapsules and contact of the dye precursor with a dye developer.

EXAMPLE II (a) Oily Solution

An oily solution is made as in Example I except 60.5 g of Coronate EH, an isocyanurate-modified aliphatic polyisocyanate from Nippon Polyurethane Kogyo K. K. is used in place of the Desmodur N-3200.

(b) Aqueous Solution

The aqueous solution is prepared as in Example I.

(c) Encapsulation/Compound Process

The process is exactly as in Example I.

EXAMPLE III (a) Oily Solution

In a 2L beaker dissolve 36 g of Pergascript I-2GN Green 18.15 g of Pergascript I-6B Red, and 81.5 g of Pergascript I-BR Black (all available from Ciba-Geigy) in 726 g diisopropyl naphthalene. At room temperature, add a solution of 100 g of Cythane 3160. an addition product of tetramethylxylene with trimethylol propane from American Cyanamide, in 100 g diisopropyl naphthalene.

(b) Aqueous Solution

In a 4L beaker add 87.5 g casein to 850 g water. Heat to 80–85° C. and hold for 30 minutes. Cool to 60° C., and then add 28.5 g Jeffamine J-403 a polyfunctional amine from Jefferson Chemical, and 3.2 g of Borax. Stir until casein dissolves. Add 450 g of Sta-Meg 104, a methyl glucoside non-volatile diluent from Horizon Chemical Corp., and 87.5 g of polyvinyl-pyrrolidone (40,000 molecular weight). Cool the solution to room temperature.

(c) Encapsulation/Compounding Process

The process is the same as in Example I except that no diethylene triamine is added.

EXAMPLE IV (a) Oily Solution

The oily solution is prepared as in Example I, except that 91.6g of Huls adduct EXP-121-9, an adduct of hexamethylene diisocyanate with trimethylol propane from Huls Chemische Werke, is used in place of the Desmodur N-3200.

(b) Aqueous Solution

The aqueous solution is prepared as in Example III except that 10.9 g of diethylene triamine is used instead of the Jeffamine T-403.

(c) Encapsulation/Compounding Process

The process is the same as in Example I except that no diethylene triamine is added at this stage.

It will be obvious to those skilled in the art that various changes may be made without departing from the scope of the invention which is not to be considered limited to what is described in the specification.

What is claimed is:

1. A high solids content, aqueous, microcapsule-containing printing ink, comprising:
    an aqueous solution containing water and a non-volatile diluent,
    oil-containing microcapsules dispersed in said aqueous solution, and
    a protective colloid blend dispersed in said aqueous solution, said protective colloid blend comprising a blend of hard, brittle, poor film-forming resin with soft, pliable, film-forming resin.

2. The printing ink of claim 1 wherein said protective colloid blend is present in said aqueous solution in an amount ranging from 4 to 8% by weight.

3. The printing ink of claim 2 wherein said protective colloid blend is a blend of materials selected from the group consisting of styrene-maleic anhydride copolymers, methyl vinyl ether-maleic anhydride copolymers, styrene-maleic ester copolymers, methyl vinyl ether-maleic ester copolymers, carboxymethylcellulose, casein, polyvinyl alcohol, polyvinyl pyrrolidone, acrylic resins, and styrenated acrylic resins.

4. The printing ink of claim 3 wherein said protective colloid blend is a blend of casein and polyvinyl pyrolidone in equal amounts by weight.

5. The printing ink of claim 3 further including a latex binder emulsion or an alkali soluble resin.

6. The printing ink of claim 1 wherein said solids content of said printing ink is approximately 60–70% by weight.

7. A high solids content, aqueous, microcapsule-containing printing ink, comprising:
    an aqueous solution containing water and a non-volatile diluent, said non-volatile diluent being selected from the group consisting of methyl glucoside, dimethyl urea, dimethyl hydantoin formaldehyde resin, sorbitol, erythritol, and polyoxethylene polyols,
    oil-containing microcapsules dispersed in said aqueous solution, and
    a protective colloid blend dispersed in said aqueous solution, said protective colloid blend comprising a blend of hard, brittle, poor film-forming resin with soft, pliable film-forming resin.

8. The printing ink of claim 7 wherein said protective colloid blend is present in said aqueous solution in an amount ranging from 4 to 8% by weight.

9. The printing ink of claim 8 wherein said protective colloid blend is a blend of materials selected from the group consisting of styrene-maleic anhydride copolymers, methyl vinyl ester-maleic anhydride copolymers, styrene-maleic ester copolymers, methyl vinyl ether-maleic ester copolymers, carboxymethylcellulose, casein, polyvinyl alcohol, polyvinyl pyrrolidone, acrylic resins, and styrenated acrylic resins.

10. The printing ink of claim 9 wherein said protective colloid blend is a blend of casein and polyvinyl pyrolidone in equal amounts by weight.

11. The printing ink of claim 9 further including a latex binder emulsion or an alkali soluble resin.

12. The printing ink of claim 7 wherein said solids content of said printing ink is approximately 60–70% by weight.

* * * * *